(12) United States Patent
Yamada et al.

(10) Patent No.: US 6,568,587 B1
(45) Date of Patent: May 27, 2003

(54) COLLAPSIBLE MEASURING CONTAINER

(75) Inventors: Masashi Yamada, Tokyo (JP); Katsura Tanaka, Tokyo (JP)

(73) Assignee: Meiji Dairies Corporation, Tokyo (JP)

( * ) Notice: Subject to any disclaimer, the term of this patent is extended or adjusted under 35 U.S.C. 154(b) by 0 days.

(21) Appl. No.: 09/831,280

(22) PCT Filed: Nov. 9, 1999

(86) PCT No.: PCT/JP99/06235

§ 371 (c)(1),
(2), (4) Date: Jun. 19, 2001

(87) PCT Pub. No.: WO00/28288

PCT Pub. Date: May 18, 2000

(30) Foreign Application Priority Data

Nov. 10, 1998 (JP) ............................. 10-318967

(51) Int. Cl.[7] .......................... B65D 25/56; G01F 19/00; G01F 23/02
(52) U.S. Cl. ............................. 229/162; 73/334; 73/427; 116/227; 222/157
(58) Field of Search ........................ 229/162; 383/106; 220/662, 663; 116/227; 73/334, 426, 427; 222/157

(56) References Cited

U.S. PATENT DOCUMENTS

| 303,422 A | * | 8/1884 | Long ............................ 73/334 |
| 2,177,918 A | * | 10/1939 | Vogt et al. ................... 229/162 |
| 2,226,340 A | * | 12/1940 | Flood ........................... 220/663 |
| 2,294,473 A | * | 9/1942 | Makeley ....................... 229/162 |
| D209,693 S | * | 12/1967 | Pittman ......................... 73/427 |
| 3,490,678 A | * | 1/1970 | James et al. ................. 229/162 |
| 3,530,722 A | * | 9/1970 | Miller ........................... 73/427 |
| 3,690,523 A | * | 9/1972 | Link ............................. 229/162 |
| 5,012,972 A | * | 5/1991 | Nordstrom et al. ......... 229/162 |
| 5,197,625 A | * | 3/1993 | Mullaney ...................... 229/162 |
| 5,516,038 A | * | 5/1996 | Zaccarini ..................... 229/162 |
| 6,238,907 B1 | * | 5/2001 | Schuler-Maloney et al. .. 73/426 |

FOREIGN PATENT DOCUMENTS

| EP | 187334 A2 | * | 7/1986 | ................ 229/162 |
| JP | 5140361 | | 3/1976 | |
| JP | U6390160 | | 6/1988 | |
| JP | 375119 | | 7/1991 | |
| JP | U375119 | | 7/1991 | |
| JP | 728089 | | 7/1991 | |
| JP | 712244 | | 9/1991 | |
| JP | U618928 | | 3/1994 | |

* cited by examiner

Primary Examiner—Gary E. Elkins
(74) Attorney, Agent, or Firm—Birch, Stewart, Kolasch & Birch, LLP

(57) ABSTRACT

A self-supporting container formed by folding a shape-retaining paper sheet in substantially W-shape and joining opposite side edges of the inner surface thereof. At least one side wall of the container is provided with a see-through window and graduations for measuring the contents are formed at or adjacent to the window. By reading these graduations, the contents are easily measured. Supplementary graduations for measuring small amounts and auxiliary members for accurate measuring are also added.

7 Claims, 7 Drawing Sheets

COLLAPSIBLE MEASURING CONTAINER

This application is the national phase under 35 U.S.C. §371 of PCT International Application No. PCT/JP99/06235 which has an International filing date of Nov. 10, 1999, which designated the United States of America.

FIELD OF THE INVENTION

The present invention relates to a container being able to stand by itself as said container is erected from its flatly collapsed state to its three-dimensional state. The present invention particularly relates to such container enabling a quantity of content therein to be measured.

DESCRIPTION OF THE RELATED ART

The container is well known which is able to stand by itself as it is erected from its flatly collapsed state to its three-dimensional state even before filled with the content. Such collapsible container is disclosed, for example, in Japanese Utility Model Publication Gazettes Nos. 1995-12244 and 1995-28089 and Japanese Utility Model Application Disclosure Gazette No. 1991-75119.

A typical example of such containers of well known art will be described in reference with FIGS. 1 through 6 of the accompanying drawings.

The paper sheet-like blank is formed by an outside member (1) and an inner member (2) both being substantially rectangular and laminated with each other. The outside member (1) comprises shape-retainable paperboard and provided with a plurality of cutting edge-marked fold lines (a)~(f) and a punched opening (6). The inside member (2) is formed by flexible film, e.g., polyethylene film.

The paper sheet-like blank comprises a bottom forming section (3) destined to form a bottom of the container and side wall forming sections (4) contiguous to both sides of said bottom forming section (3) via the cutting edge-marked fold lines (b), (c).

The bottom forming section (3) includes a bottom plate (5) corresponding to the container bottom, substantially triangular punched openings (6) and is formed along transversely side edges with cutouts (7). The side wall forming sections (4) respectively comprise side walls (8) corresponding to the container side walls, side margins to paste up (9) contiguous to both side edges to the respective side walls (8) via the cutting edge-marked fold lines (d) and top margins to paste up (10) contiguous to said side walls (8) via the cutting edge-marked fold lines (f).

Erection of the container starts to fold the bottom forming section (3) outward along the cutting edge-marked fold line (a) bisecting the bottom forming section (3). Then side wall forming sections (4) are folded inward along the respective cutting edge-marked fold lines (b), (c). In this way, the blank presents a substantially W-shaped cross-section as seen in FIG. 2. Thereafter, the inner surface of the side margins to paste up (9) formed by a polyethylene layer and is welded to each other by heat-sealing as seen in FIG. 3. Thereupon, the side edge portions of the folded bottom plate (5) are also heat-sealed together with said side margins to paste up (9) since said side edge portions include cutouts (7).

In this step, the container is still in its collapsed state, i.e., in a relatively flat envelope-like state. Now the bottom forming section (3) is unfolded along the cutting edge-marked fold line (a) and thereby the container is three-dimensionally erected so that the container can stand by itself. FIG. 6 shows this state of the container.

Through a top opening, fluid content such as drink powder, instant coffee or curry roux is poured into the container and heat-sealed along the top margins to paste up (10) to obtain a relatively flat product, as shown in FIG. 4.

To unseal the product, the top margins to paste up (10) are cut off along the cutting edge-marked fold lines (f) and thereby the container top is opened as shown in FIG. 5. Then, the side margins to paste up (9), (9) are respectively gripped by fingers and pushed inward from the both sides. The envelope-like container is thereby folded along the respective cutting edge-marked fold lines (e) to four faces of the side wall. At the same time, the bottom plate (5) is flattened and the container takes a shape of square pillar which can stand by its self, as shown in FIG. 6.

It should be understood that this container could be manufactured and supplied without any content, i.e., as the container alone. The container is stored in its flatly collapsed state and, in actual use, three-dimensionally erected as the container being able to stand by itself.

Of the collapsible container as has been described above, the container provided at an upper predetermined position on the side wall (8) with a projection (k) serving as a measuring line is disclosed in Japanese Utility Model Application Disclosure Gazette No. 1991-75119.

The container disclosed therein allows a user to determine whether the container has been filled with the content to a level indicated by said projection (k) or not. However, it is impossible for this container of prior art to measure an exact quantity of the content has been poured into the container.

It is a principal object of the present invention to provide a collapsible container of simplified construction facilitating the content of the container to be easily measured.

SUMMARY OF THE INVENTION

The object set forth above is achieved, according to the present invention, by an improvement of the collapsible measuring container constructed in a manner as will be described. The container comprises a shape-retainable and airtight paper sheet-like blank folded substantially in W-shape and having inner surface of its transversely opposite side edges bonded together so that the container may stand by itself.

The improvement according to the invention is characterized by that said container is provided in at least one side wall with a seen-through window and graduations used to measure a quantity of the content are printed on said window or in the vicinity thereof.

According to one preferred embodiment of the invention, said paper sheet-like blank comprises a laminate consisting of an outside member made of paperboard and an inside member made of substantially transparent film so that measurement of the content may be easily achieved merely by visual recognition and a desired shape of the container can be reliably ensured. Said inside member is preferably formed by laminated film of stretched polypropylene and polyethylene from the viewpoint of an airtightness of the container as well as the manufacturing cost.

According to another embodiment of the invention, said window is provided in the form of a vertically extending slot substantially in the middle of said one side wall of the container standing by itself.

In this way, a quantity of the content is in order to facilitate a quantity of the content to be easily measured without deterioration of the container's shape-retainability. A lower end of said window is position to be slightly spaced above from a bottom of the container. Such arrangement contributes to the shape-retainability of the container.

After the content has been consumed until the surface of the content comes behind the lower edge of said window, it is no more possible to measure its quantity. To compensate such inconvenience, there may be provided auxiliary measuring means to measure a small quantity of the content remaining in the container. Any one of the auxiliaries measuring means as will be described below is effective in spite of relatively simplified construction thereof.

As one example of such means, graduations used to measure a small quantity of the content are printed on inner surface of the container below said lower end of the window. With this arrangement, even a small quantity of the content can be measured merely by looking into the inner surface of the container.

Another example, the container is provided on at least one face of the side wall with a seen-through small window extending upward obliquely from the vicinity of a container's corner. In addition, graduations used to measure a small quantity of the content are printed on said small window or in the vicinity thereof. In this case, the container may be tilted so that the surface of the content may appear in the small window and even a small quantity may be measured.

Said graduations are printed on the outside member along transversely opposite side edges of said window or on the window itself of the inside member. In this way, a quantity of the content by visual recognition is further facilitated.

A shape-retainer is put around the outer surface of the container's side wall so that said shape-retainer may come in tight contact with at least a part of said outer surface. In this way, lateral expansion of the container due to a weight of the content can be reliably avoided in order to ensure a precise measurement.

Figure 1:
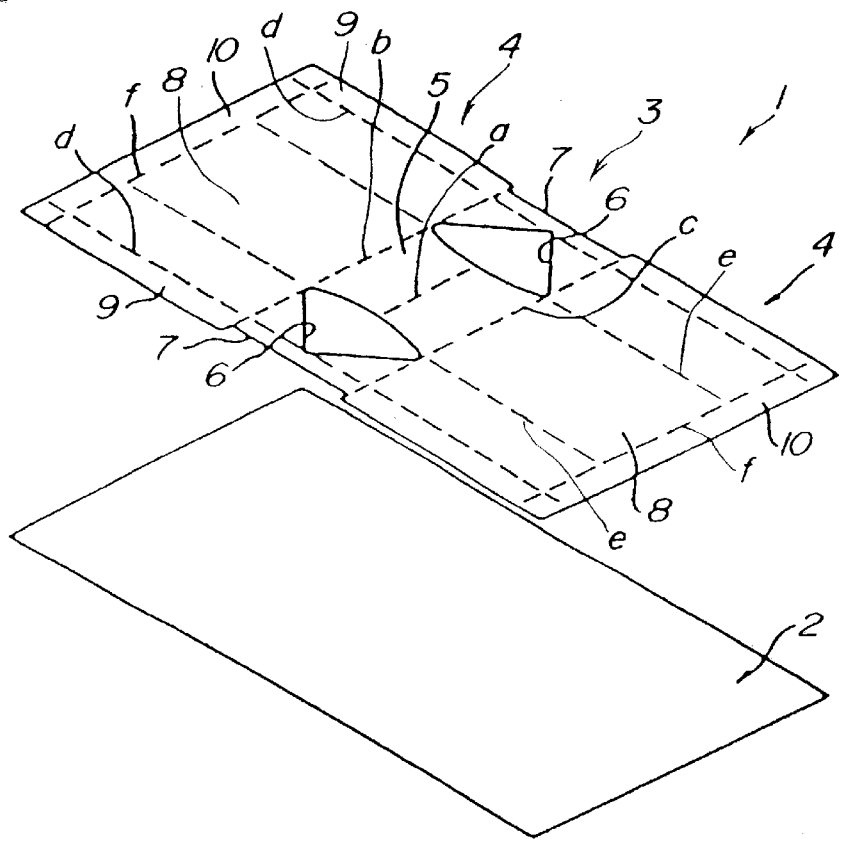
FIGS. 1 through 6 illustrate a collapsible measuring container of prior art and FIGS. 7 through 10 illustrate a collapsible measuring container according to the present invention. Substantially equivalent parts are designated by reference numerals common to said container of prior art and said container according to the present invention.
Figure 2:
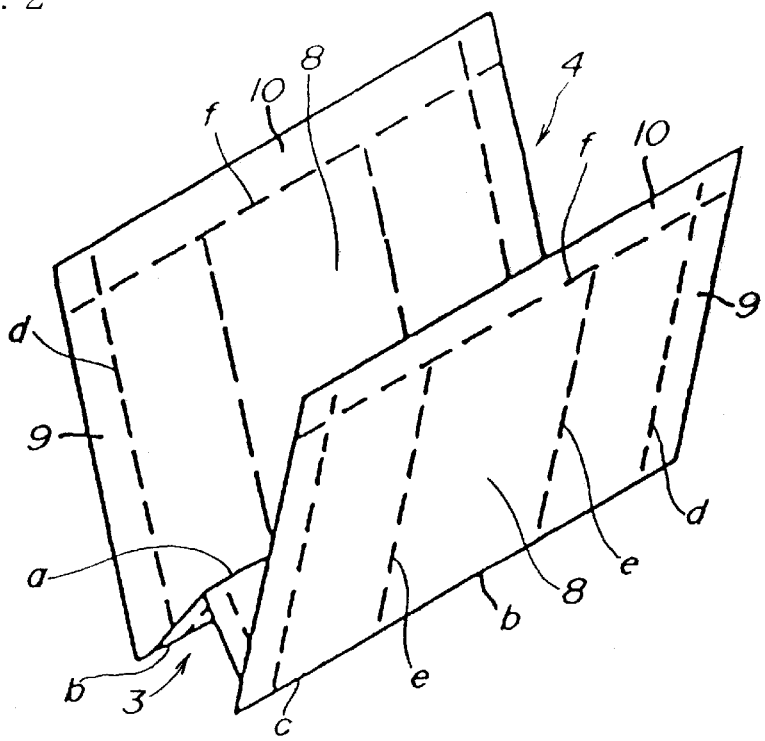
Figure 3:
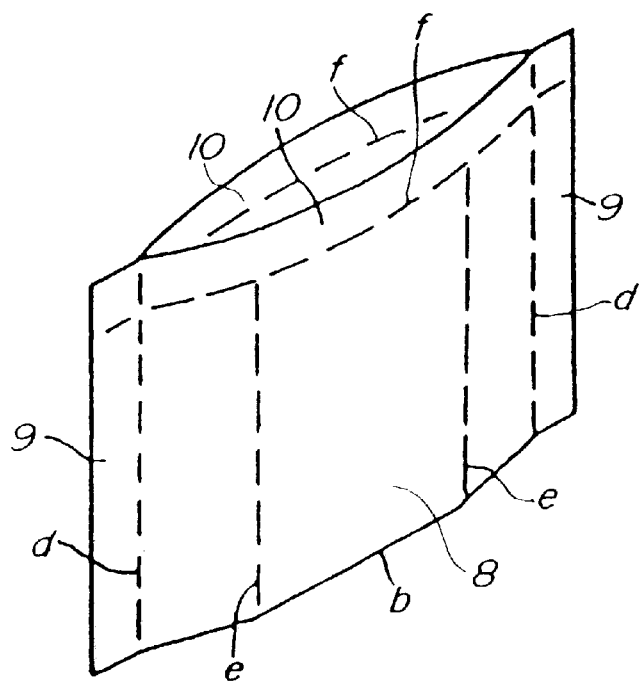
Figure 4:
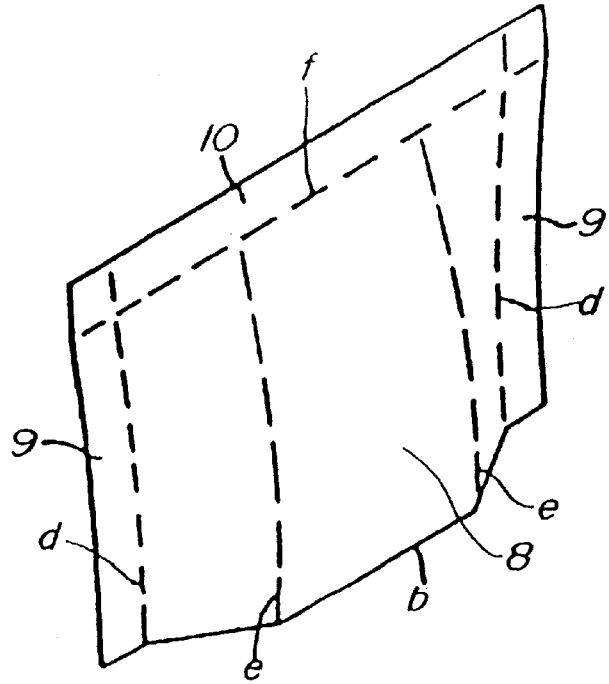
Figure 5:
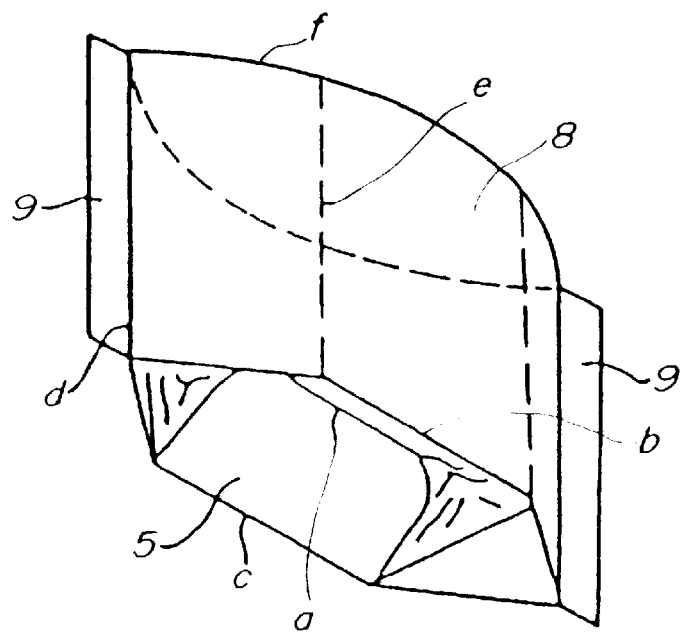
Figure 6:
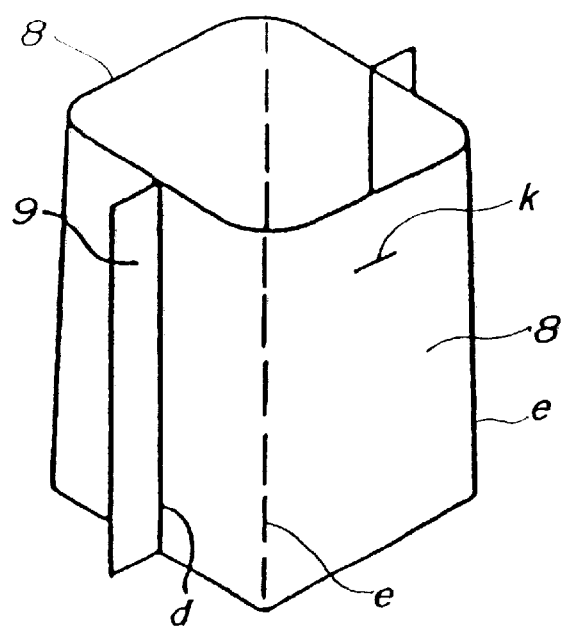

The drawings will be described more specifically:

FIG. 1 is an exploded perspective view illustrating paper sheet-like outside and inside members forming the collapsible measuring container of prior art; FIGS. 2 and 3 are perspective views illustrating the paper sheet-like members of FIG. 1 in the course of assembling them to the container; FIG. 4 is a perspective view illustrating a product in the form of the container filled with content; FIG. 5 is a perspective view illustrating the product of FIG. 4 as the container as unsealed; FIG. 6 is a perspective view illustrating the container as standing by itself.

Figure 7:
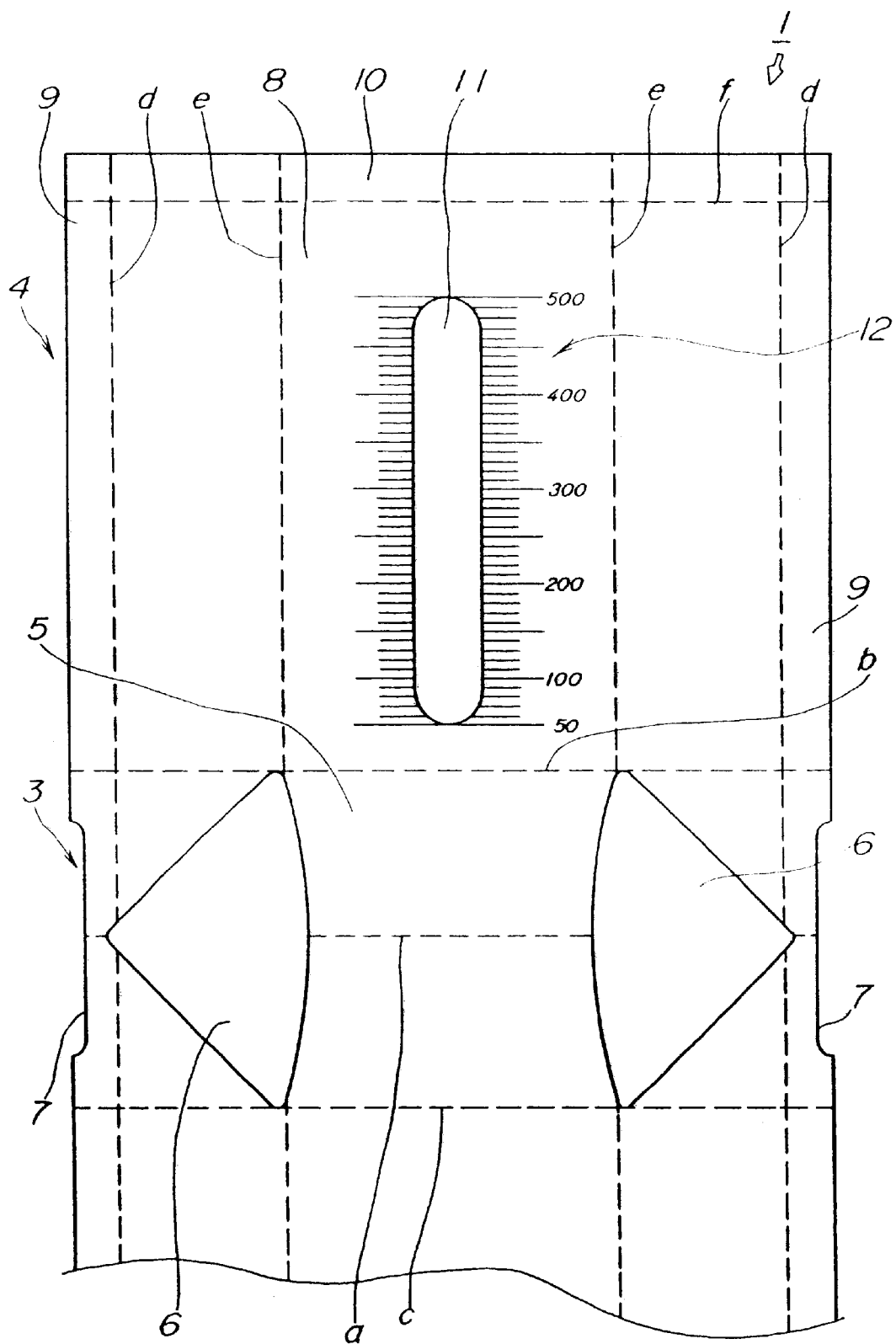
Figure 8:
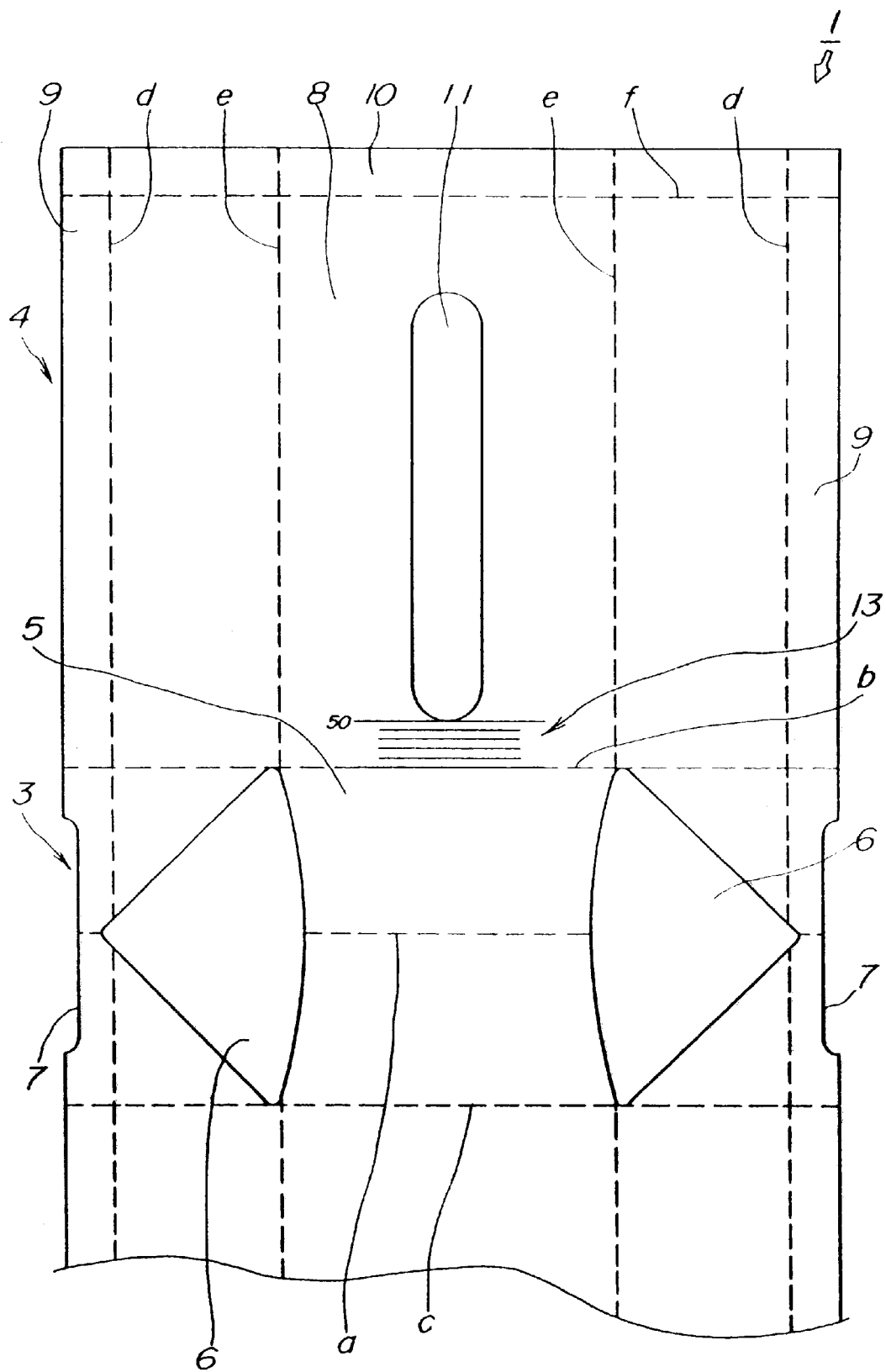
Figure 9:
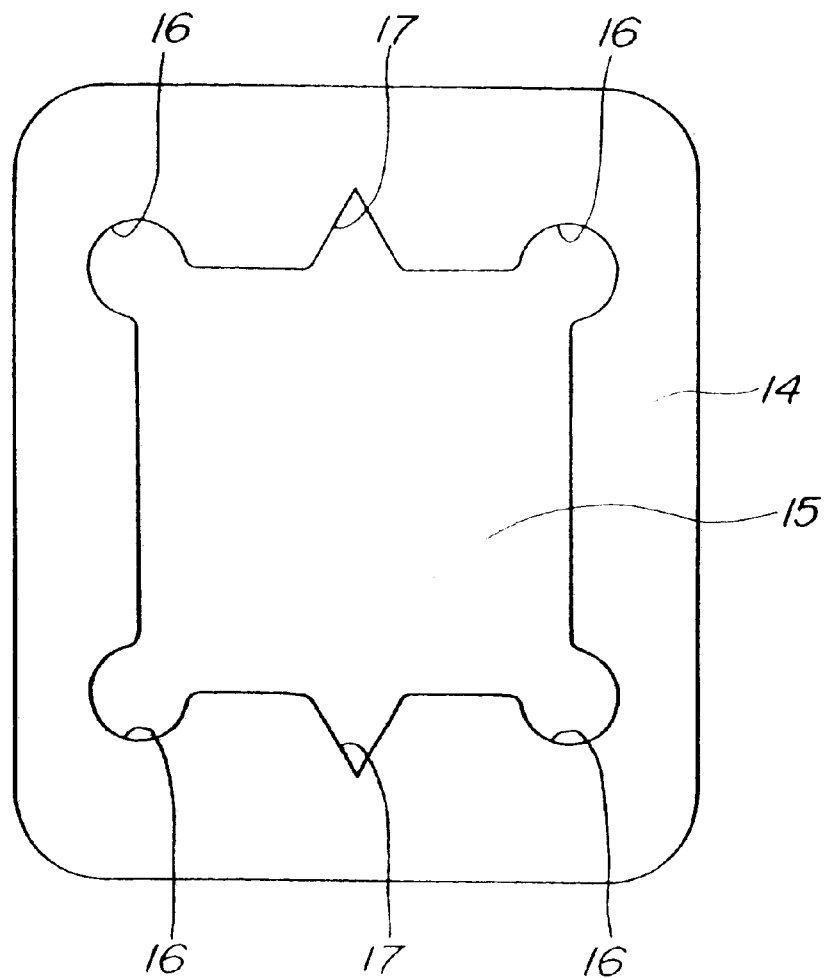
Figure 10:
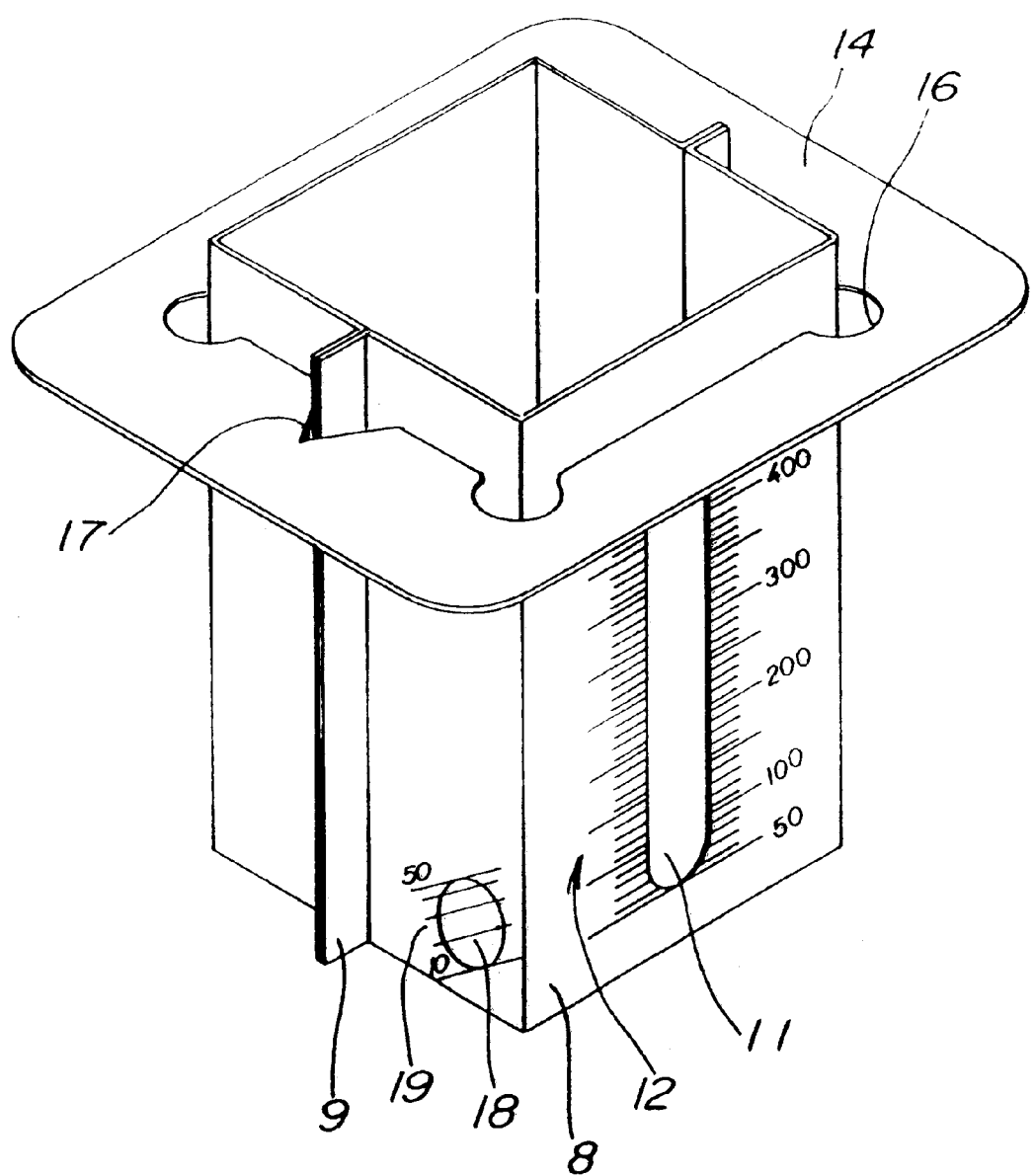

FIG. 7 is a plan view illustrating front surface of a developed outside member forming the collapsible measuring container according to the present invention as partially broken away; FIG. 8 is a view similar to FIG. 7 illustrating a rear surface of said outside member; FIG. 9 is a front view illustrating a shape-retainer; and FIG. 10 is a perspective view illustrating the container provided with the shape-retainer as standing by itself.

Identification of reference numerals used in the drawings is as follows: 1 outside member, 2 inside member, 3 bottom forming region, 4 side wall forming region, 5 base plate, 6 punched openings, 7 cutouts, 8 side wall, 9 side margins to paste up, 10 top margins to paste up, 11 window, 12 graduations, 13 supplementary graduations, 14 shape-retainer, 15 opening, 16 cutouts, 17 cutouts, 18 small window, 19 supplementary graduations, a~f depressed folding lines.

DESCRIPTION OF THE PREFERRED EMBODIMENTS

Details of the present invention will be more fully understood from the description given hereunder in reference with FIGS. 7 through 10. However, the features similar to those in the prior art illustrated by FIGS. 1 through 6 will not be described in detail avoid duplication. It should be understood that the present invention is not limited to the description given hereunder and may be appropriately varied and modified.

The collapsible measuring container according to the invention is characterized in that the side wall (8) of said self-supporting collapsible measuring container of prior art is additionally provided with a window (11) and graduations (12). The window (11) is substantially transparent so that the content can be visually recognized from the exterior. The graduations (12) are marked on the window (11) itself or in the vicinity thereof so that the content seen through the window (11) can be measured.

FIGS. 7 and 8 illustrate front and rear surfaces of a paper sheet-like outside member (1).

The outside member (1) may be made of shape-retainable paperboard or synthetic resin sheet, for example, thick paper having a basis weight of 157 g/m². The sidewall (8) of the container is formed in at least its one face with a slot-like punched opening as the window (11).

The window (11) vertically extends substantially in the middle of said side wall face when the container is assembled and self-stands. The window (11) extending to the bottom of the container would result in deterioration of the container's shape-retainability. In view of such anxiety, a lower end of the window (11) is appropriately spaced above from the container's bottom and thereby a desired strength of the container is maintained.

Along transversely opposite side edges of the window (11), graduations (12) for measurement, for example, in a range from 50 ml to 500 ml, are printed at intervals of 10 ml on the container.

If a quantity of the content is less than 50 ml, the surface of the content would be lower than the lower end of the window and it would be impossible to measure the quantity by visual recognition from the exterior. The present invention solves this problem by providing the container with supplementary measuring means.

As will be apparent from FIG. 8, the outside member (1) is provided on its rear surface with supplementary graduations (13) exclusively to measure a small quantity of the content. The graduations (13) are printed on the rear surface at intervals of 10 ml so as to extend downward from the lower edge of the window (11). The graduations (13) indicate a small quantity, for example, 0 ml~50 ml so that a user may look into the container to measure a quantity as small as 50 ml or less.

A small quantity of the content may be measured also using an alternative supplementary means illustrated by FIG. 10.

FIG. 10 illustrates another preferred embodiment of the present invention having such alternative supplementary means adapted to measure a small quantity of the content.

This embodiment also has a small window (18) provided with graduations similar to said window (11) provided with said graduations (12) as well as supplementary graduations (19). However, the small window (18) and the supplementary graduations (19) according to this embodiment extend upward obliquely from the vicinity of a container's lower corner. The container may be tilted with the content's surface kept in parallel to these supplementary graduations (19) to measure a quantity of the content as small as 50 ml or less.

The paper sheet-like blank comprises the outside member (1) and the inside member (2) made of substantially transparent seen-through film. The outside member (1) contributes to a shape-retainability of the container and the inside member (2) contributes to an airtightness of the container. The inside member (2) preferably comprises two-layered laminated film-like sheet consisting of stretched polypropylene of $25\mu$ and polyethylene of $40\mu$ from the viewpoint of airtightness and manufacturing cost.

The supplementary graduations (13) provided on the inner surface of the container may be printed on the inside member (2). However, the graduations (13) are preferably printed on the outside member (1) since these graduations (13) must be precisely positioned with respect to the window (11) of the outside member (1)

The container filled with a large quantity of the content may be laterally expanded under a weight of the content and make exact measurement difficult. To overcome this problem, there is provided a shape-retainer (14).

As illustrated by FIG. 9, the shape-retainer (14) is a substantially square thin plate centrally formed with an opening (15). The opening (15) is also of a substantially square shape. The opening (15) is dimensioned to come, at least partially, in close contact with the outer surface of the side wall (8) of the self-supporting container. The opening (15) is provided at its four corners with circular arc-shaped cutouts (16), respectively, to facilitate the container to be inserted into the opening (15). The opening (15) has a pair of opposite sides formed with substantially triangular cutouts (17), respectively, to receive the side margins to paste.

One or more such shape-retainer(s) may be put on the container from above and/or below to hold the container around the outer peripheral surface of its side wall (8). The container is thereby forcibly shape-retained to prevent undesirable lateral expansion of the container and to ensure a precise measurement.

When it is desired to supply the container separately of the content, the shape-retainer (14) may be dimensioned sufficiently small to be appropriately packaged together with the container.

INDUSTRIAL APPLICABILITY

The container according to the present invention is adapted to be flatly and compactly collapsed for storage and to self-support immediately before filled with content for its actual use. In spite of its simplified construction, this collapsible container itself facilitates a quantity of the content to be measured. This collapsible measuring container is further provided with the supplementary means used to measure a small quantity of the content remaining in the container with a high precision.

As will be apparent from the foregoing description, the present is not limited to the container for food and drink and applicable also to a measuring instrument useful for various purposes. For example, the container according to this invention can be useful as a disposable container for the urine test.

What is claimed is:

1. A collapsible measuring container comprising shape-retainable and airtight paper sheet blank folded substantially in W-shape and having transversely opposite side edges bonded together so that the container may stand by itself, wherein:

said container is provided in at least one side wall with a first seen-through window and first graduations used to measure a quantity of a content are printed on said first window or in the vicinity of said first window;

said container is provided in outer surface of at least one side wall with a second seen-through window in a slot vertically extending upward and having a lower end of said slot slightly spaced above a bottom of the container;

second graduations used to measure a quantity of the content are printed on said second window or in the vicinity of said second window; and third graduations exclusively used to measure a small quantity of the content remaining in the container are printed on inner surface of the container below said lower end of the second window.

2. The collapsible measuring container according to claim 1, wherein said paper sheet blank comprises a laminate consisting of an outside member made of paperboard and an inside member made of substantially transparent film.

3. The collapsible measuring container according to claim 2, wherein said inside member comprises laminated film of stretched polypropylene and polyethylene.

4. The collapsible measuring container according to claim 1, wherein said first window is a small window used to measure small quantity of the content remaining in the container and said first graduations extend upward obliquely from the vicinity of a lower corner of said container.

5. The collapsible measuring container according to claim 1, wherein said second graduations are printed on an outside member along transversely opposite side edges of said second window.

6. The collapsible measuring container according to claim 1, wherein said second graduations are printed on an inside member along transversely opposite side edges of said second window.

7. The collapsible measuring container according to claim 1, wherein a shape-retainer is put around the outer surface of the container's side wall so that said shape-retainer may come in tight contact with at least a part of said outer surface and thereby retain a desired shape of the container.

* * * * *